Feb. 14, 1928.
T. D. McCARTIE
1,659,039
PRESSURE BOOSTER FOR GREASE GUNS
Filed March 19, 1925
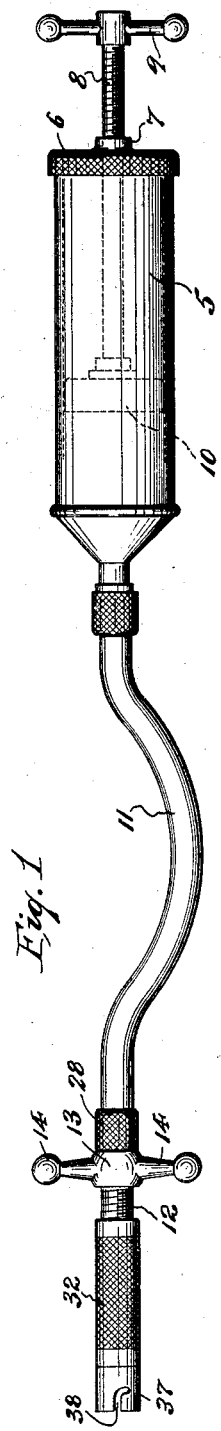
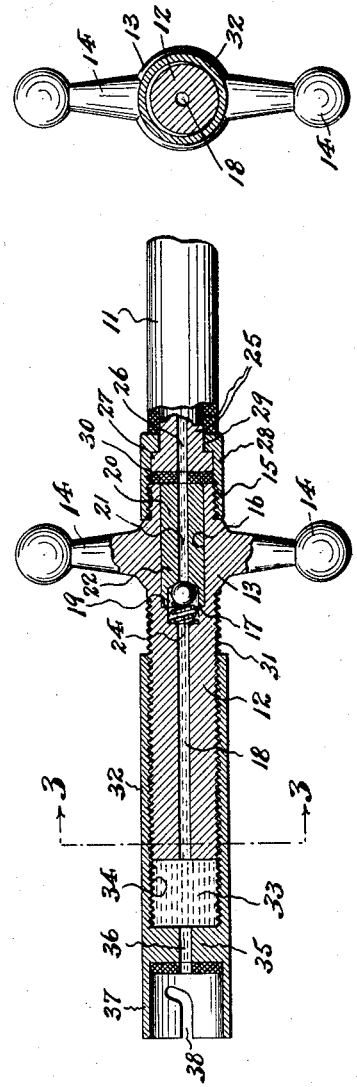
INVENTOR.
Thomas D. McCartie,
BY
Frantzel and Richards
ATTORNEYS.

Patented Feb. 14, 1928.

1,659,039

UNITED STATES PATENT OFFICE.

THOMAS D. McCARTIE, OF NEWARK, NEW JERSEY, ASSIGNOR OF ONE-HALF TO JOHN D. CARDINELL, OF MONTCLAIR, NEW JERSEY.

PRESSURE BOOSTER FOR GREASE GUNS.

Application filed March 19, 1925. Serial No. 16,696.

This invention relates, generally, to improvements in grease guns adapted to inject a lubricant into bearings by pressure; and the invention has reference, more particularly, to a novel attachment for grease guns adapted to boost or increase the pressure normally developed thereby.

The invention has for its principal object to provide in combination with any ordinary construction of grease gun, an attachment by means of which the pressures, normally developed by the usual operation of the gun, may be boosted to attain, at the point of discharge of lubricant into a bearing being served, a relatively highly increased pressure effective upon a comparatively small mass of lubricant, so that the latter is more easily caused to enter clogged bearings by forcing and breaking down the clogging obstruction, and more easily caused to penetrate, either clogged or relatively tight bearings. To the above end, this invention comprises an externally threaded rotative plunger in swiveled connection with the free end of the discharge pipe, conduit or nozzle of the main grease gun; said plunger having an axial grease passage alined with the said discharge pipe, conduit or nozzle, and being provided with a check valve operative against back pressure; and said plunger being threaded into an internally threaded booster cylinder of comparatively small cross-sectional area, which is provided at its discharge end with suitable coupling means cooperative with coupling members with which the bearings to be served are provided.

With the objects of this invention in view, the same consists, primarily, in the novel pressure booster for grease guns hereinafter set forth; and, the invention consists, furthermore, in the novel arrangements and combinations of the several devices and parts, as well as in the details of the construction of the same; all of which will be more fully described in the following specification, and then finally embodied in the claims appended thereto.

The invention is clearly illustrated in the accompanying drawings, in which:—

Figure 1 is a side elevation of a grease gun equipped with the novel pressure boosting device made according to and embodying the principles of this invention; Figure 2 is a longitudinal section, on an enlarged scale, through the novel pressure boosting attachment; and Figure 3 is a detail transverse section, taken on line 3—3 in Figure 2.

Similar characters of reference are employed in all of the hereinabove described views, to indicate corresponding parts.

Referring now to said drawings, the reference character 5 indicates the cylindrical barrel or body of the main grease gun, which is closed at one end by a separable cap 6 having a central internally threaded neck 7. Threaded through said neck 7 is an externally threaded piston stem 8, having at its outer end a suitable handle member 9 for turning the same, and having attached to its inner end a piston or plunger 10 slidable through the interior of the cylindrical barrel or body 5 when said piston stem 8 is rotated. Usually grease guns of this type are provided, in connection with their discharge ends, with a flexible discharge pipe or conduit 11.

My novel pressure booster attachment is adapted to be connected with the free end of said discharge pipe or conduit 11, although it will be understood that it may, if desired, be directly attached to the discharge end of the cylinder barrel or body 5 of the main grease gun, without departing from the scope of this invention.

My novel pressure booster attachment comprises a rotative plunger member 12, having adjacent to its rearward end an enlarged annular portion 13, from which radiate in lateral extension suitable handle members 14 by means of which said rotative plunger member 12 may be operatively manipulated. Said plunger member 12 is provided at its rearward end with an externally threaded axially alined coupling boss 15. The rearward end of said plunger member 12 is provided with an inwardly extending bore 16, having a diametrically reduced portion at its inner end to provide a valve housing or chamber 17. Extending forwardly from said valve housing or chamber 17 is an axially alined longitudinal grease passage 18 of further reduced diameter. Entered within said bore 16, and so as to be stopped against the annular shoulder 19, intermediate the inner end of said bore 16 and said reduced valve housing or chamber 17, is an inlet valve-piece 20 provided with an axial valve passage 21 extending therethrough, and terminating at its inner end in a valve seat 22. Disposed within said valve housing or chamber 17 is a ball check valve 23, the same being normally pressed rearwardly in seated relation to said valve seat 22 by a compression spring 24 positioned between the said ball check valve 23 and the forward end of said valve housing or chamber 17.

Said rotative plunger member is connected with the free end of said discharge pipe or conduit 11 so as to swivel in connection therewith, and thus be capable of being rotated about its longitudinal axis. To this end the discharge pipe or conduit 11 is provided at its free end with a connector piece 25 to which the same is suitably secured. Said connector piece 25 possesses a grease passage 26 extending therethrough, and is further provided at its outer end with an annular enlargement or head 27. Fitted over said outer end of said connector piece 25, so as to turn thereon, is a coupling sleeve 28, which is retained against outward longitudinal separation from said connector piece 25 by an internal annular keeper shoulder 29 which abuts the annular enlargement or head 27 of said connector piece 25. The outer end of said coupling sleeve 28 is internally threaded so that the same may be screwed upon the coupling boss 15 of the plunger member 12, to thus couple the latter in swiveled relation to said connector piece 25. A perforate packing washer 30 is interposed between the opposed end faces of said coupling boss 15 and connector piece 25, to thus render the swivel joint leak-proof. The plunger member 12, beyond the handle members 14, is provided with external screw threads 31.

The reference character 32 indicates a booster cylinder of relatively small cross-sectional area, as compared with the cross sectional area of the cylindrical barrel or body 5 of the main grease gun, the interior of which provides a high-pressure grease chamber 33, which is open at its rearward end, and which is internally threaded, as at 34, to receive the free or outer externally threaded body of said plunger member 12. The outer end of said chamber 33 is closed by a transverse wall 35 which is provided with a central discharge or outlet port 36. The outer free end of said booster cylinder beyond said wall 35 is formed to provide an open ended coupling sleeve 37 having bayonet slots 38 in its sides, whereby the same may be telescopically engaged over and interlocked with suitable coupling members (not shown) with which the bearings to be served are provided, all in the manner familiar to those skilled in the art to which this invention refers. It will be understood, however, that any suitable form of cooperative coupling means, other than that hereinabove referred to, may be employed for operatively engaging the booster cylinder with a bearing to be served.

In operation, the grease gun equipped with the novel pressure booster means made according to this invention as above described, is coupled with a bearing to be served. Before thus operatively coupling the booster cylinder 32, the plunger member 12 is backed or retracted rearwardly in the high pressure grease chamber 33, although not disconnected from the cylinder 32. The interior of the barrel or body 5 of the main grease gun is filled with the grease or lubricant desired to be delivered into the said bearing, so that by turning inwardly the threaded piston stem 8 the piston 10 will exert a pressure upon the grease or lubricant, whereby the same is driven outwardly through the discharge pipe or conduit 11, and thence onward through the inlet valve passage 21, the ball check valve 23 yielding forwardly to the passage of the grease or lubricant onward through the grease passage 18 of the plunger member 12 into the high pressure chamber 33. If the normal pressure developed in the barrel or body 5 of the main grease gun, by the downward movement of the piston 10, is alone sufficient to drive the grease or lubricant into the bearing being served, the said grease or lubricant, under such pressure, will be ejected from the chamber 33 through the outlet port 36, and thence into the bearing. If, however, the bearing being served, by reason of being very tight or of being clogged from any cause, offers abnormal resistance to the penetration of the grease or lubricant, then the pressure booster device is actuated, whereby a greatly increased discharging pressure upon the grease is built up and exercised upon the relatively small mass of the latter which fills the high pressure chamber 33. The actuation of the pressure booster device is accomplished by axially turning the plunger member 12 in such direction that its external threads 31 in turning on the internally threaded sides of the chamber 33, will cause an inward movement of the plunger 12. Since the cross sectional area of the chamber 33 and plunger member 12 is relatively small, it follows that an exceedingly increased pressure may be exerted upon the relatively small mass of grease or lubricant within the chamber 33. There is no loss of this increased pressure by reason of backing of the grease through the grease passage 18 of the plunger member 12, and thence through the discharge pipe or conduit 11 to the barrel or body 5 of the main grease gun, for the reason that the check-valve 23 is forced into tightly closed relation to the valve seat 22 by the back pressure, so that the grease or lubricant in the plunger grease passage 18 becomes immovable, and, for all purposes involved, renders the plunger member 12 equivalent, during its operative pressure building stroke, to a solid piston or plunger. The swiveled connection of the plunger member 12 with the discharge pipe or conduit 11 permits of easy rotation of the plunger member 12 without impedance by reason of the direct connection of the discharge pipe or conduit 11 therewith. The high pressure thus exerted upon the grease or lubricant in advance of the plunger member 12 impels the former, with greatly increased force, outwardly through the outlet port 36, and thence into the bearing being served. The highly increased pressure and force exerted upon the discharged grease or lubricant tends to quickly cause the same to dislodge any obstruction which clogs the bearing lubricating spaces or passages, so that the grease or lubricant is quickly distributed around the bearing surfaces.

It will be evident from the accompanying drawings, and the above description, that my novel pressure booster attachment is of a very compact and simple, yet none the less efficient construction, and at the same time offers a device which is very easy and simple to actuate.

Having thus described my invention, I claim:—

1. A pressure booster device for grease guns, comprising a booster cylinder of comparatively small cross-sectional area open at its rearward end and having an outlet port at its forward end, the interior of said booster cylinder being internally threaded, means at the discharge end of said booster cylinder for coupling the same with a bearing to be served, a rotative plunger member, said rotative plunger member being externally threaded to fit said internally threaded booster cylinder, said plunger member having an axial grease passage extending therethrough, a valve means cooperating with said passage to prevent rearward movement of grease therethrough, and a swivel connection for uniting the rearward end of said plunger member with the discharge means of a grease gun.

2. A pressure booster device for grease guns, comprising a booster cylinder of comparatively small cross-sectional area open at its rearward end and having an outlet port at its forward end, the interior of said booster cylinder being internally threaded, means at the discharge end of said booster cylinder for coupling the same with a bearing to be served, a rotative plunger member, said rotative plunger member being externally threaded to fit said internally threaded booster cylinder, laterally projecting handle members connected with the rearward exterior end of said plunger member, said plunger member having a bore extending inwardly from its rearward end and terminating in a diametrically reduced portion providing a valve housing, said plunger member being further provided with an axial grease passage extending forwardly therethrough from said valve housing, a valve-piece entered in said bore, said valve piece having an axial valve passage, a spring pressed ball check-valve in said valve housing to normally close said valve passage, and a swivel connection for uniting the rearward end of said plunger member with the discharge means of a grease gun.

3. The combination with a main grease gun having a discharge conduit of a pressure booster device, comprising an internally threaded booster cylinder having a discharge means at its forward end, an externally threaded plunger member rotatively engaged in said cylinder, an axial grease passage extending through said plunger member, a check-valve means to close said grease passage against rearward movement of grease therethrough, and means for rotatively connecting the rearward outer end of said plunger member in axial alinement and in direct communication with said discharge conduit of said main grease gun.

In testimony, that I claim the invention set forth above I have hereunto set my hand this 3rd day of March, 1925.

THOMAS D. McCARTIE.